(12) United States Patent
Miklaszewski et al.

(10) Patent No.: US 10,883,805 B2
(45) Date of Patent: Jan. 5, 2021

(54) SYSTEMS AND METHODS FOR MODIFYING AND ENHANCING EXPLOSIVES BY IRRADIATING A REACTION ZONE

(71) Applicant: The United States of America, as represented by the Secretary of the Navy, Crane, IN (US)

(72) Inventors: Eric J. Miklaszewski, Bloomington, IN (US); Jonathan M. Dilger, Bloomington, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/276,334

(22) Filed: Feb. 14, 2019

(65) Prior Publication Data

US 2019/0234717 A1   Aug. 1, 2019

Related U.S. Application Data

(60) Provisional application No. 62/631,210, filed on Feb. 15, 2018.

(51) Int. Cl.
| | | |
|---|---|---|
| *F42B 3/113* | (2006.01) | |
| *G01N 21/01* | (2006.01) | |
| *G01N 21/3577* | (2014.01) | |
| *G01N 21/35* | (2014.01) | |

(52) U.S. Cl.
CPC .............. *F42B 3/113* (2013.01); *G01N 21/01* (2013.01); *G01N 21/3577* (2013.01); *G01N 2021/0106* (2013.01); *G01N 2021/3595* (2013.01)

(58) Field of Classification Search
CPC ..... F42B 3/113; G01N 21/01; G01N 21/3577; G01N 2021/0106; G01N 2021/3595
USPC .......................................................... 102/201
See application file for complete search history.

(56) References Cited

U.S. PATENT DOCUMENTS

| | | | | |
|---|---|---|---|---|
| 3,362,329 A | * | 1/1968 | Epstein ................... | F42B 3/113 102/201 |
| 3,812,783 A | * | 5/1974 | Yang ..................... | H01S 3/0007 102/201 |
| 4,391,195 A | * | 7/1983 | Shann ..................... | F42B 3/113 102/201 |

(Continued)

OTHER PUBLICATIONS

Iowa State (ISURF), "Microwave Flame Enhancement of Energetic Material Combustion," Unpublished Non Provisional U.S. Appl. No. 15/452,531, filed Mar. 7, 2017.

*Primary Examiner* — John Cooper
(74) *Attorney, Agent, or Firm* — Naval Surface Warfare Center, Crane Divisen; Eric VanWiltenburg

(57) ABSTRACT

The present invention relates to systems and methods for modifying or amplifying explosive devices through electromagnetic radiation (EMR). Exemplary embodiments provide increased energy density to an explosive reaction zone to allow increased blast overpressures, detonation velocity, and energy release without changing the explosive materials or quantity of explosives. An exemplary embodiment irradiates a reaction zone immediately before an explosive detonates to modify the explosive properties of an explosive device. Exemplary embodiments utilize automated targeting of EMR sources for precise modification of explosions with standardized and predictable effects.

4 Claims, 5 Drawing Sheets

(56) References Cited

U.S. PATENT DOCUMENTS

| | | | | |
|---|---|---|---|---|
| 4,862,802 A * | 9/1989 | Streifer | F42B 3/113 | 102/201 |
| 5,179,248 A * | 1/1993 | Hartman | F42B 3/13 | 102/202.1 |
| 5,206,455 A * | 4/1993 | Williams | F42B 3/113 | 102/201 |
| 5,229,542 A * | 7/1993 | Bryan | F42B 3/113 | 102/201 |
| 5,493,972 A * | 2/1996 | Winterberg | B01J 3/08 | 102/305 |
| 5,756,924 A * | 5/1998 | Early | F02C 7/264 | 102/201 |
| 5,835,545 A * | 11/1998 | Turchi | G21B 1/00 | 376/145 |
| 6,460,459 B1 * | 10/2002 | Mc Cahon | F41H 13/0062 | 102/201 |
| 6,843,178 B2 * | 1/2005 | Wood | H05H 1/52 | 102/207 |
| 7,340,025 B2 * | 3/2008 | Melin | H05H 1/52 | 102/306 |
| 7,478,594 B1 * | 1/2009 | Chen | F42B 3/113 | 102/201 |
| 8,981,261 B1 * | 3/2015 | Tillotson | F41H 13/0093 | 219/383 |
| 9,097,503 B1 * | 8/2015 | Perry, III | F42C 19/0807 | |
| 2003/0047101 A1 * | 3/2003 | Folsom | F42B 3/113 | 102/201 |
| 2004/0055497 A1 * | 3/2004 | Herbelin | F42B 12/204 | 102/475 |
| 2006/0011083 A1 * | 1/2006 | Perry | C06C 7/00 | 102/205 |
| 2007/0044673 A1 * | 3/2007 | Hummel | F42B 3/113 | 102/206 |
| 2007/0044674 A1 * | 3/2007 | Wood | H01Q 21/26 | 102/214 |
| 2007/0113941 A1 * | 5/2007 | Moulard | C06C 7/00 | 149/92 |
| 2008/0307993 A1 * | 12/2008 | Chan | F42B 3/121 | 102/214 |
| 2015/0141540 A1 * | 5/2015 | Golding | C06C 9/00 | 521/168 |
| 2017/0074625 A1 * | 3/2017 | Appleby | F42D 1/055 | |
| 2018/0299236 A1 * | 10/2018 | Miklaszewski | H05H 1/16 | |

* cited by examiner

PRE-EXPLOSION PLASMA, LONGER EFFECT

SYSTEMS AND METHODS FOR MODIFYING AND ENHANCING EXPLOSIVES BY IRRADIATING A REACTION ZONE

CROSS-REFERENCE TO RELATED APPLICATIONS

This patent application claims the benefit of U.S. Provisional Application No. 62/625,131, titled "SYSTEMS AND METHODS FOR MODIFYING AND ENHANCING EXPLOSIVES BY IRRADIATING A REACTION ZONE", filed Feb. 15, 2018, the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200,506) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to systems and methods for amplifying explosive devices through electromagnetic radiation (EMR).

There is a need for the development of new primary and secondary explosives. Primary explosives (primaries) are materials that are sensitive to some external stimulus (e.g., impact, friction, electrostatics, heat, shock, etc.). These materials can be very dangerous to handle due to their ease of ignition. Their role in a typical explosive configuration is to rapidly produce an explosive shockwave to initiate secondary explosives (secondaries). Secondaries are less sensitive to external stimuli and have higher energy densities compared to primaries.

TNT has an energy density of 4.2 MJ/kg. Some of the most energy dense secondary explosives in literature are RDX and CL-20, both having an energy density of 6.2 MJ/kg. Nuclear reactions have a drastically higher energy density (greater than 1 TJ/kg) such that they are not feasible for most applications. As a general rule, higher explosive performance correlates to high energy density material and higher enthalpy of formations. Synthesis chemists try to predict and synthesize new higher density, higher energy, and stable/insensitive explosives for higher performance and lower sensitivity. Current means of making new, higher performance explosives are not cost effective and the marginal benefit of each improvement is decreasing. Because there are no energy density options available between current secondaries and nuclear materials, to create a larger overall explosive yield one must either increase the amount of the explosives used or switch to nuclear options.

To solve these problems, embodiments of this invention disclose the application of electromagnetic radiation (EMR) to enhance explosions by increasing the energy density of an explosive reaction zone without altering the composition of the explosives. Exemplary embodiments can allow the energy density, detonation pressure, and detonation velocity to be increased for various explosive materials.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
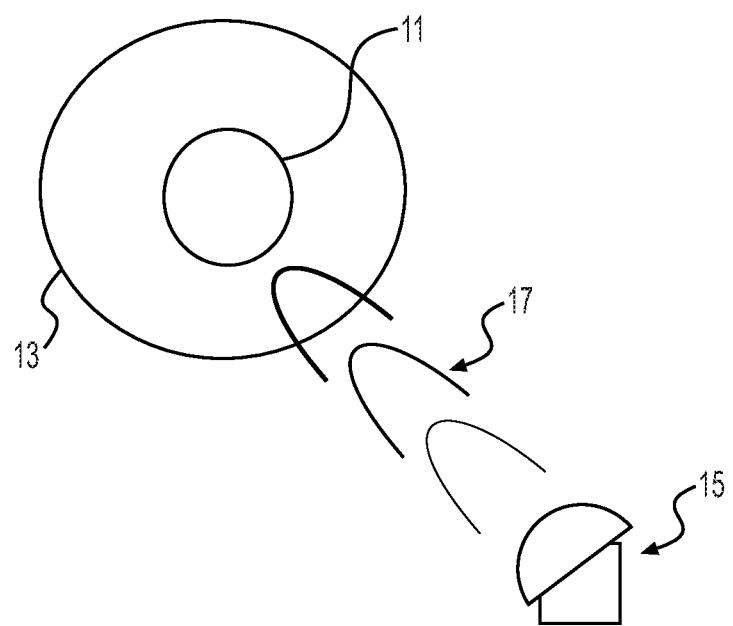
FIG. 1 shows an exemplary system for irradiating an explosive device with EMR.

FIG. 1 shows an exemplary system for modifying and enhancing explosions by irradiating an explosive device 11 with EMR 17 originating from an EMR source 15. When an explosive device 11 is initiated, a rapid exothermic chemical reaction converts the explosive material in high temperature/pressure gasses. These combustion products expand at high velocities resulting in a shock wave 13. The shock wave is approximated as an expanding bubble of highly compressed air traveling radially outward at supersonic speeds from the source of the explosion. This event typically occurs over a period of milliseconds. EMR 17 irradiating an explosive device 11 in this narrow timeframe can cause increased blast overpressures, detonation velocity, and energy release without changing the explosive materials or quantity of explosives. It has been approximated that for some explosions that less than half of the chemical energy available in a given explosive is released during this first detonation event. The remaining energy is released on a much longer time scale in the area behind the initial shock wave where detonation products mix with air and deflagrate until they reach equilibrium. Continuing to irradiate an explosive device 11 during this secondary deflagration stage can result in in a higher combustion temperature and sustained or altered deflagration effects. In addition, the chemical species of the secondary fireball may be altered to create custom sustained deflagration events or to spread the deflagration to multiple targets. In some embodiments, metal doped explosive materials (e.g., as low as 0.01% aluminum powder by weight) can be incorporated into explosive device 11 such that EMR 17 causes enhanced absorption, resulting in higher combustion temperatures and other deflagration effects.

Figure 2:
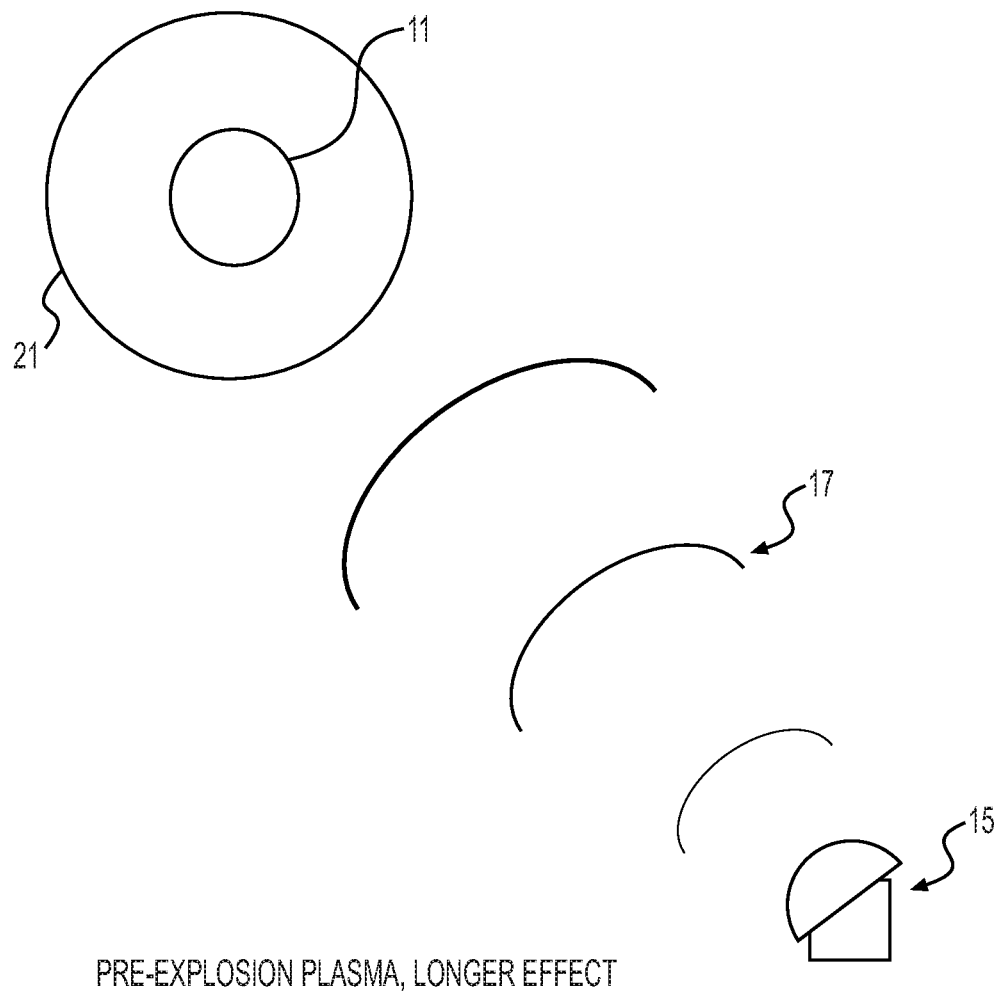
FIG. 2 shows an exemplary system for modifying and enhancing explosions by creating a plasma region around an explosive device.

FIG. 2 shows an exemplary system for modifying and enhancing explosions, such as the system shown in FIG. 1, wherein an EMR source 15 delivers EMR 17 to a region surrounding an explosive device 11 to create a plasma region 21. In exemplary embodiments, a plasma region 21 is created prior to detonation of an explosive device 11. Because the detonation phase of an explosive has a comparatively short life (e.g. less than 1 second), in some applications directing EMR 17 towards an explosive device 11 at the time of detonation may not provide enough time for plasma to accumulate for the desired enhancement of explosive effects to occur. Creating a plasma region 21 prior to detonation can allow the explosive event to occur in a plasma field of higher enthalpy which would result in increased blast overpressures, detonation velocity, and energy release without changing the explosive materials or quantity of explosives. Further delivery of EMR throughout the explosive event and subsequent deflagration would result in higher yields, combustion temperatures, and sustained or altered deflagration effects. In some embodiments, a cloud of metal doped explosive materials can be dispersed into the area of the plasma region 21 as a particulate cloud prior to irradiation. The particulate metals can seed the plasma field by absorbing EMR 17 to facilitate plasma production. After a plasma region 21 and particulate cloud have been created, a triggering event (e.g., an explosive device, prolonged irradiation leading to thermal initiation) can then initiate the explosion. EMR 17 exposure can continue as long as desired and can cease once an operator wants to cease deflagration. In some embodiments, metal doped explosive materials (e.g., as much aluminum powder by weight as possible) can be incorporated into explosive device 11 such that EMR 17 causes enhanced absorption, resulting in higher combustion temperatures and other deflagration effects. Due to the addition of EMR 17, higher metal doped/energy dense explosives (e.g., 99% aluminum by weight) can be realized and successfully detonated. In additional embodiments, explosive material can be dispersed into the air prior to initiation. The EMR then deposits energy into the explosive material itself as well as into the gas surrounding the dispersed explosive material. The initial detonation event, though it occurs on short timescales, would have the benefit of prior deposited EMR energy in the reaction zone and would therefore have considerably more enthalpy to release upon reaction. This would result in increased blast overpressures, detonation velocity, and energy release without changing the explosive materials or quantity of explosives. Furthermore, the air surrounding the explosive material will have a higher speed of sound due to the energy deposited due to EMR prior to the initiation. This effect by itself would result in higher shock wave velocities with for an identical explosion, let alone an EMR enhanced explosion. Further delivery of EMR throughout the explosive event and subsequent deflagration would result in higher yields, combustion temperatures and sustained or altered deflagration effects.

Figure 3B:
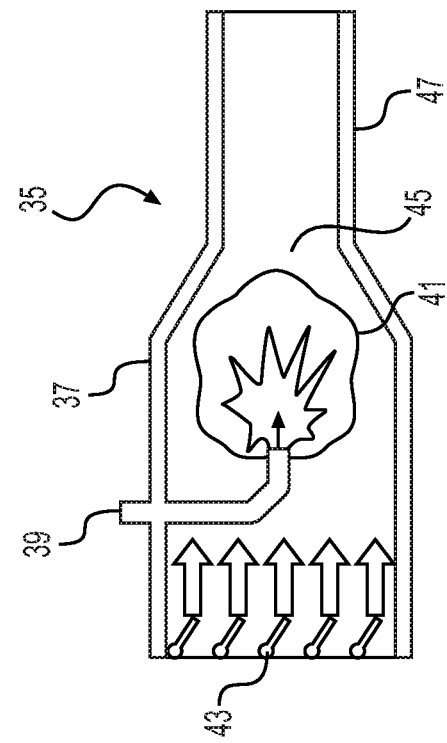
FIG. 3B shows an exemplary system for irradiating explosions within a pulsejet engine
Figure 3A:
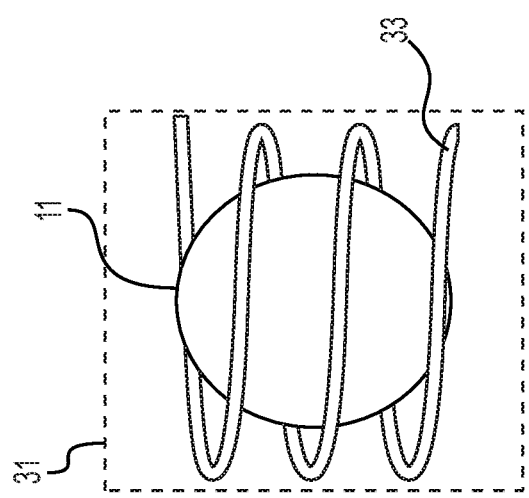
FIG. 3A shows an exemplary system for irradiating explosions within confined spaces.

FIGS. 3A and 3B show exemplary embodiments wherein enhancement of explosions occurs within a compressed space. FIG. 3A shows an explosive device 11 within a cylindrical container 31. The inductive coil 33 is embedded within the cylindrical container 31 such that it circles the explosive device 11. Passing an electric current through inductive coil 33 generates EMR which is used to enhance explosions within the container 31. While the inductive coil 33 can be entirely inside the container 31 in some embodiments, embedding the inductive coil 33 within the walls of the container 31 can prevent the inductive coil 33 from being damaged by an explosion. In other embodiments, EMR can enter the container externally from an outside EMR source. Exemplary embodiments can be used to increase pressures within confined spaces (e.g., within an engine piston department) without increasing fuel usage or maintaining a constant pressure while using less fuel. FIG. 3B shows another embodiment utilizing EMR to amplify the discharge of a pulsejet engine 35. A pulsejet engine (PE) 35 operates by igniting a mixture of air from air intake valves 43 and gaseous fuel 41 within a combustion cavity 45. The burning and expansion of the gas forces hot gas to be expelled from a tailpipe 47, creating thrust. Another exemplary embodiment utilizes a similar design as that shown in FIG. 3B to amplify the discharge of a pulse detonation engine (PDE), where the ignition of fuel causes a detonation to create thrust. EMR can begin irradiating immediately prior to the detonation event and end irradiating once the majority of combustion gasses have exited tailpipe engine body 37. In both the PE 35 and PDE embodiments, inductive coils can be embedded within the walls of an engine body 37 or tailpipe 47 to create a field of plasma within the combustion cavity 45 to enhance the combustion of the fuel to create more thrust or consume less fuel. As the combustion forces gases to exit the tailpipe 47, inductive coils can continue to create plasma for the next combustion event such that a predetermined amount of plasma remains in the combustion cavity 45 throughout operation. Flexible antennae XX can be molded to particular combustion chamber shapes/designs such that a maximum amount of EMR 17 can be directed into the chamber while minimizing leakage/waste.

Figure 4:
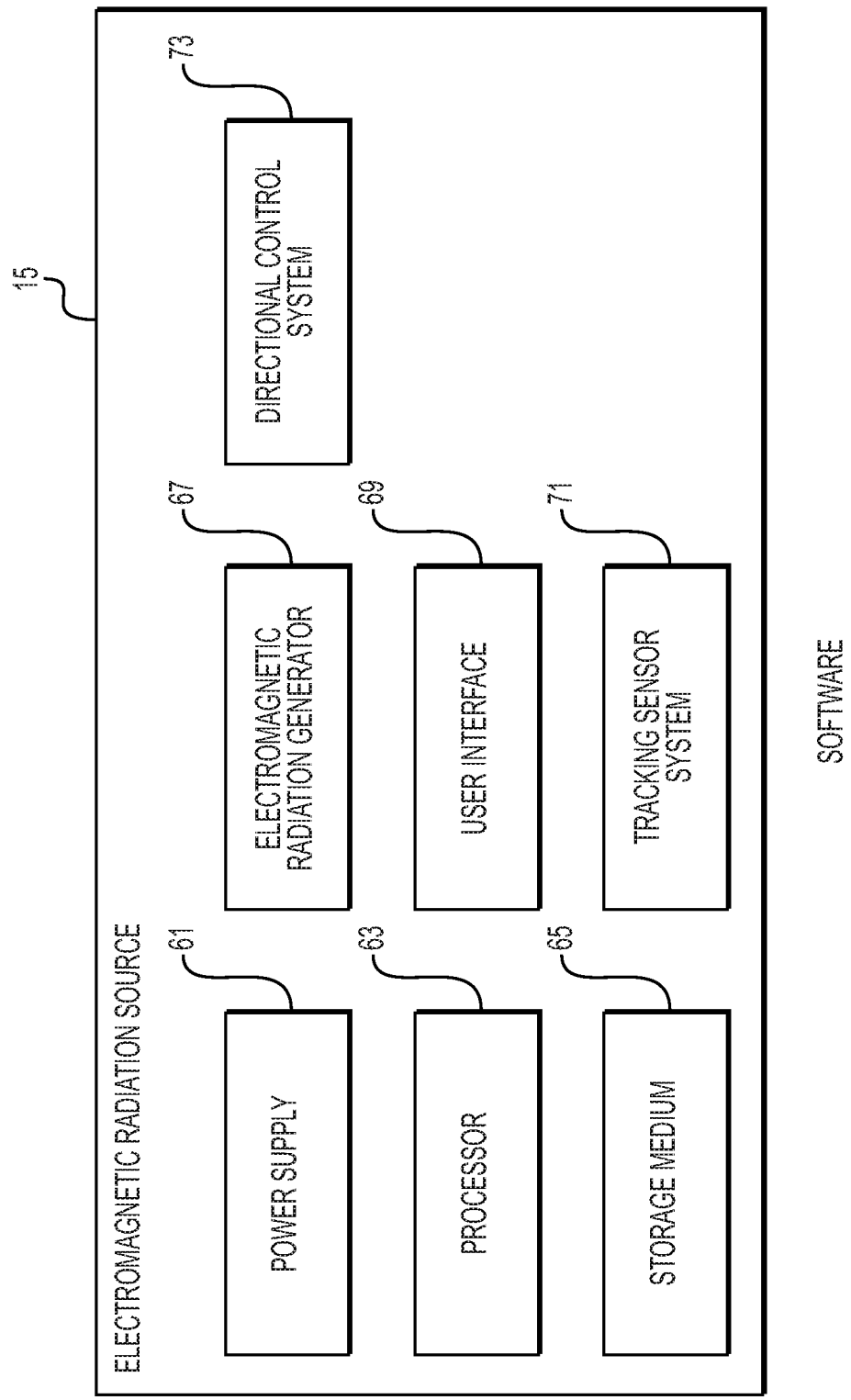
FIG. 4 shows a block diagram of the system architecture of an exemplary EMR source

FIG. 4 shows a block diagram of the system architecture of an exemplary EMR source 15. A EMR source 15 can include a power supply 61, a processor 63, a storage medium 65, an EMR generator 67, a user interface 69, a tracking sensor system 71, and a directional control system 73. The storage medium 65 can store a plurality of machine instructions relating to the operation of the EMR source 15 which the processor 63 can read and transmit to other components. The user interface 69 can allow an operator to select machine instructions to execute or to enter machine instructions which can be transferred to the storage medium. The EMR generator 67 can generate EMR (e.g. varying wavelengths, varying durations, varying solid angles of projection, etc.) according to a machine instructions received from the processor. A tracking sensor system 71 can allow a EMR source 15 to identify a predetermined target or area of interest and create a plurality of tracking signals. A directional control system 73 can allow the system to move the EMR generator 67 such that the direction of generated EMR can change in response to predetermined machine instructions, user entered instructions, or a plurality of tracking signals received from a tracking sensor system 71. In an exemplary embodiment, a user can input instructions through a user interface 69 to instruct a tracking sensor system 71 to track a particular object (e.g., an explosive device). When the tracking sensor system 71 detects the object, it generates a plurality of tracking signals and transmits these signals to a directional control system 73. The directional control system 73 can then move the EMR source 15 so that the EMR generator 67 directs EMR towards a specific area on or around the tracked object. Exemplary systems allow EMR to be directed towards object to maximize or control the effects of the EMR on explosions while minimizing detrimental secondary effects.

Figure 5:
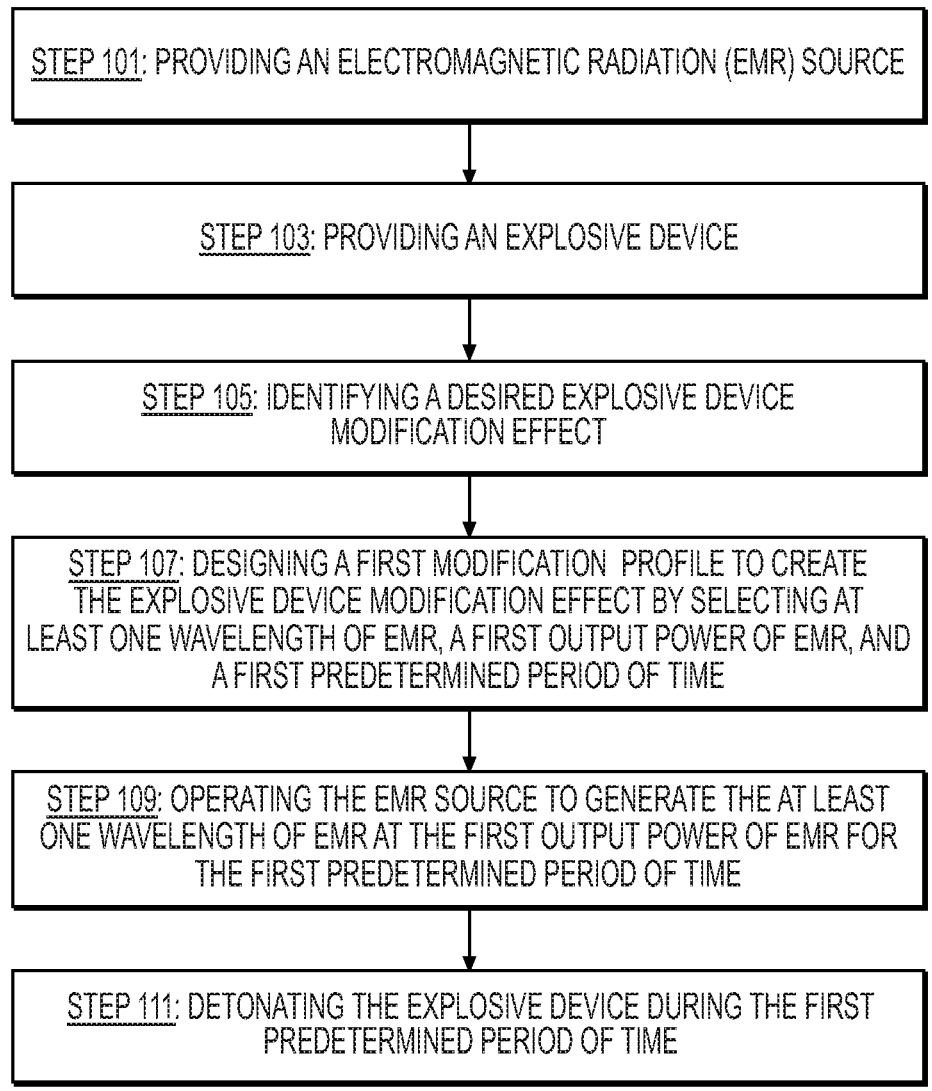
FIG. 5 shows an exemplary method of modifying and enhancing explosions by irradiating an explosive device.

FIG. 5 shows an exemplary method of modifying and enhancing explosions by irradiating an explosive device. At step 101: providing an electromagnetic radiation (EMR) source. At step 103: providing an explosive device. At step 105: identifying a desired explosive device modification effect. At step 107: designing a first modification profile to create the explosive device modification effect by selecting at least one wavelength of EMR, a first output power of EMR, and a first predetermined period of time. At step 109: operating the EMR source to generate the at least one wavelength of EMR at the first output power of EMR for the first predetermined period of time. At step 111: detonating the explosive device during the first predetermined period of time.

Although the invention has been described in detail with reference to certain preferred embodiments, additional variations and modifications exist within the spirit and scope of the invention as described and defined in the following claims.

The invention claimed is:

1. A system for modifying explosive devices comprising:
    an electromagnetic radiation (EMR) source comprising:
        an EMR generator configured to generate a first plurality of EMR comprising at least one wavelength at a first output power for a first predetermined period of time, and an explosive device;
    wherein the EMR generator is further configured to direct the at least one wavelength of the first plurality of EMR towards a reaction zone such that the first plurality of EMR increases an energy density of the reaction zone
    wherein the explosive device is within the reaction zone;
    wherein the explosive device explodes during the first predetermined period of time;
    wherein the generator is further configured to generate a second plurality of EMR at a second output power for a second predetermined period of time, wherein the second predetermined period of time follows the first predetermined period of time;
    wherein the second plurality of EMR interacts with conflagration effects of the explosive device.

2. The system of claim 1, the explosive device comprising metal doped explosive materials.

3. A system for modifying explosive devices comprising:
    an electromagnetic radiation (EMR) source comprising:
        a user interface configured to allow an operator to input a first modification profile comprising first configuration settings for at least one wavelength of EMR, a first output power of EMR, and a first predetermined period of time,
        a storage medium configured to store the first modification profile,
        a processor configured to read the first modification profile and transfer the first configuration settings to an EMR generator, and
        the EMR generator configured to generate a first plurality of EMR comprising the at least one wavelength at the first output power for the first predetermined period of time, and an explosive device;
    wherein the EMR generator is further configured to direct the first plurality of EMR towards a reaction zone such that the first plurality of EMR increases an energy density of the reaction zone;
    wherein the explosive device is within the reaction zone;
    wherein the explosive device explodes during the first predetermined period of time
    wherein the generator is further configured to generate a second plurality of EMR at a second output power for a second predetermined period of time after receiving a second modification profile, wherein the second predetermined period of time follows the first predetermined period of time;
    wherein the second plurality of EMR interacts with conflagration effects of the explosive device.

4. The system of claim 3, the explosive device comprising metal doped explosive materials.

* * * * *